3,185,698
NEW ANTHRAQUINONE DYESTUFFS
Jacob Koch and Max Jost, Basel, Switzerland, assignors to Ciba Limited, Basel, Switzerland, a Swiss company
No Drawing. Filed Feb. 18, 1963, Ser. No. 259,362
Claims priority, application Switzerland, Feb. 21, 1962, 2,091/62; Feb. 6, 1963, 1,411/63
4 Claims. (Cl. 260—303)

The present invention provides anthraquinone dyestuffs that are free from acidic groups imparting solubility in water and that contain an amino group in 1-position, a benzoxazole or benzthiazole radical in 2-position and a halogen atom or an amino group acylated with the radical of an aliphatic carboxylic acid or with the radical of a carbonic acid alkyl ester in 4-position.

The dyestuffs of the invention correspond more especially to the formula

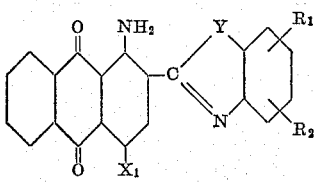

in which $X_1$ represents a chlorine or a bromine atom or an amino group acylated with the radical of an aliphatic carboxylic acid that contains at most 6 carbon atoms but advantageously at most 4 carbon atoms, $R_1$ and $R_2$ each represent a hydrogen atom or a halogen atom or an alkyl, alkoxy, amino, arylsulfonyl or amidosulfonyl group, and Y represents an oxygen atom or a sulfur atom.

The new dyestuffs are obtained when (a) 1-amino-anthraquinones that contain a carboxylic acid-(N-ortho-hydroxyphenyl)-amide group in 2 position or a carboxylic acid-(N-ortho-mercaptophenyl)-amide group and a halogen atom or an aliphatic acylamino group in 4-position are reacted with agents that bring about ring closure, or (b) 1-amino-anthraquinones that contain a benzoxazole or benzthiazole radical in 2-position and a primary amino group in 4-position are acylated with a compound yielding the radical of an aliphatic carboxylic acid or the radical of a carbonic acid alkyl ester.

For example, the dyestuffs of the invention are obtained by reacting a 1-amino-4-halogen-anthraquinone-2-carboxylic acid-(N-ortho-hydroxyphenyl)-amide or a 1-amino-4-halogen-anthraquinone-2-carboxylic acid-(N-ortho-mercapto-phenyl)-amide with an agent that brings about ring closure, for example, with sulfuric acid, paratoluene sulfonic acid, thionyl chloride or benzoyl chloride, in an inert solvent, advantageously with the application of heat, in which process the corresponding 2-(benzoxazolyl-2'-)-anthraquinone or 2-(benzthiazolyl-2')-anthraquinone is obtained.

A 1-amino-4-acylamino-2-carboxylic acid-(N-ortho-hydroxy-phenyl)- or -(N-ortho-mercaptophenyl)-amide can be subjected in a similar manner to the ring closure reaction in order to form the benzoxazole or benzthiazole derivative.

The new dyestuffs can also be obtained, for example, by reacting a 1-amino-2-(benzoxazolyl-2'-)-4-amino-anthraquinone with a carboxylic acid halide as acylating agent, for example, with propionyl-chloride, advantageously in the presence of an agent capable of binding acid, for example, sodium carbonate, or an organic base, for example, pyridine.

As starting materials to be reacted in the manner described in the process of the invention there may be mentioned the following in addition to those already mentioned above:

1-amino-4-bromanthraquinone-2-carboxylic acid-(N-ortho-hydroxyphenyl)-amide,
1-amino-4-chloranthraquinone-2-carboxylic acid-(N-ortho-hydroxyphenyl)-amide,
1-amino-4-bromanthraquinone-2-carboxylic acid-(N-ortho-mercaptophenyl)-amide,
1-amino-4-bromanthraquinone-2-carboxylic acid-(N-2-hydroxy-5-chlorophenyl)-amide,
1-amino-4-bromanthraquinone-2-carboxylic acid-(N-2-hydroxy-5-methylphenyl)-amide, and
1-amino-4-bromanthraquinone-2-carboxylic acid-(N-2-hydroxy-5-phenyl-sulfonyl-phenyl)-amide;

there may also be mentioned 1:4-diaminoanthraquinone-2-carboxylic acid-(N-ortho-hydroxyphenyl)-amides and -(N-ortho-mercaptophenyl)-amides whose amino group in 4-position is acylated by an acetyl radical or a propionyl, butyryl, —COOCH$_3$ or —COOC$_2$H$_5$ radical. The anthraquinone carboxylic acid amides of the kind defined can be obtained in known manner by the condensation of the appropriate anthraquinone carboxylic acid halide with an ortho-aminophenol or ortho-amino-thiophenol.

As further starting materials there may also be mentioned 1:4-diamino-2-(benzoxazolyl-2')-anthraquinones, for example, 1:4-diamino-2-(benzoxazolyl-2')-anthraquinone or 1:4-diamino-2-(5'-methyl-benzoxazolyl-2')-anthraquinone and 1:4-diamino-2-(benzthiazolyl-2')-anthraquinone. Among the aliphatic carboxylic acid halides to be used as acylating agents there may be mentioned, for example, acetyl chloride, propionyl chloride, butyryl chloride or chlorocarbonic acid methyl ester or chlorocarbonic acid ethyl ester.

The new dyestuffs obtained by the process of the invention are eminently suitable, especially after conversion into a finely dispersed form, for dyeing and printing synthetic fibrous material, especially fibrous material made from aromatic polyesters. Dyeings that are distinguished by a specially good fastness to light and to chlorite and a specially good fastness to sublimation are obtained on such material by the usual dyeing methods, for example, from a dyeliquor that contains a dispersion of the dyestuff and advantageously a dispersing agent at a temperature closely approaching 100° C., if necessary, in the presence of a swelling agent, or at a temperature above 100° C. under super-atmospheric pressure.

The dyestuffs of the invention are specially suitable for dyeing by the so-called thermo-fixation process in which the fabric to be dyed is impregnated at a temperature not exceeding 60° C. with an aqueous dispersion of the dyestuff that advantageously contains 1 to 50% of urea and a thickening agent, especially, sodium alginate and is squeezed in the usual manner. Squeezing is advantageously carried out in such a manner that the impregnated fabric retains 50 to 100% of dyeliquor, calculated on its dry weight. In order to bring about fixation of the dyestuff, the fabric so impregnated is heated to a temperature above 100° C., for example, between 180 and 220° C., advantageously after drying in a current of hot air.

The thermofixation process just mentioned is of special interest for the dyeing union fabrics made of polyester fibers and cellulosic fibers, especially cotton. In this case, the padding liquor contains dyestuffs suitable for dyeing cotton in addition to the dyestuffs of the invention, for example, reactive dyestuffs, that is to say, dyestuffs that can be fixed to the fiber by the formation of a chemical bond, that is to say, for example, dyestuffs that contain a chlorodiazine radical or a chlorotriazine radical, or vat dyestuffs. If the last-mentioned dyestuffs are used, the padded fabric has to be treated with an aqueous alkaline solution of one of the reducing agents normally used in vat dyeing after it has been subjected to the heat treatment. If reactive dyestuffs are used, it is of advantage to add an agent capable of binding acid to the padding solution, for example, an alkali carbonate, alkali phosphate, alkali borate or an alkali perborate, or mixtures thereof. The dyeings obtained with the dyestuffs of the invention are advantageously subjected to an after-treatment, for example, heating with an aqueous solution of a non-ionic detergent.

Instead of unitary dyestuffs there can also advantageously be used mixtures of dyestuffs, for example, a mixture of two of the dyestuffs of the invention.

The following examples illustrate the invention. Unless otherwise stated, the parts and percentages are by weight.

Example 1

A mixture of 36.4 parts of 1-amino-4-bromanthraquinone-2-carboxylic acid chloride, 12.7 parts of ortho-aminophenol, 680 parts of ortho-dichlorobenzene and 10 parts of pyridine is stirred for 2 hours at 60° C. and for 2 hours at 90° C. After cooling the reaction mixture, the condensation product is filtered off, washed with ortho-dichlorobenzene and alcohol, stirred with hydrochloric acid of 5% strength for 1 hour at room temperature, the reaction mixture is filtered and the filter residue is washed until the washings run neutral. The product obtained is dried and then heated to the boil in 660 parts of trichlorobenzene in the presence of 2.2 parts of crystallized para-toluene sulfonic acid. The water that is liberated is distilled off together with a part of the solvent. After boiling for 20 minutes, the solution is allowed to cool and is stirred for 1 hour at room temperature. The (1'-amino-4'-bromanthraquinonyl-2')-2- benzoxazole that precipitates thereby is filtered off, washed with benzene and alcohol and then dried. It constitutes a red powder that melts at 290 to 291° C. (uncorrected). If desired, the dyestuff can be recrystallized from orthodichloro-benzene. The dyestuff so obtained dyes polyester fibers strong red tints possessing an excellent fastness to light and an excellent fastness to sublimation.

Example 2

3.55 parts of (1':4'-diamino-anthraquinonyl-2')-2-benzoxazole are stirred for 3 hours at 60 parts of nitrobenzene, 1 part of pyridine and 1.4 parts of propionyl chloride. The dyestuff of the formula

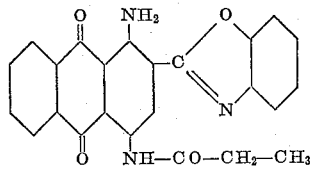

that precipitates in the form of fine blue prisms, is filtered off, washed with a small amount of nitrobenzene and then with alcohol, and is then dried. The dyestuff so obtained, applied as an aqueous dispersion, dyes polyester fibers reddish blue tints possessing an excellent fastness to light and an excellent fastness to sublimation.

When the (1':4'-diamino-anthraquinonyl-2')-2-benzoxazole is replaced by an equivalent amount of (1':4'-diaminoanthraquinonyl-2')-2-benzthiazole, there is obtained the dyestuff of the formula

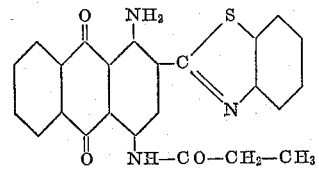

It dyes polyester fibers tints similar to those obtained with the benzoxazole derivative; the fastness to light and fastness to sublimation of these dyeings are likewise excellent.

When the propionyl chloride is replaced by 1.7 parts of chlorocarbonic acid ethyl ester, and the reaction mixture is stirred for 2 hours at 60° C., for 2 hours at 90° C. and for 12 hours at 140° C., a dyestuff of the formula

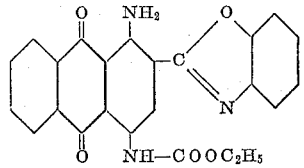

is obtained, which dyes polyester fibers blue tints possessing excellent fastness properties.

Example 3

18.2 parts of 1-amino-4-bromanthraquinone 2-carboxylic acid chloride and 14 parts of ortho-aminothiophenol are stirred for 16 hours at 65° C. with 450 parts of ortho-dichlorobenzene. The product that precipitates is filtered off, washed with ortho-dichlorobenzene, alcohol, dilute hydrochloric acid and water, and then dried. 10 parts of the product so obtained are heated at the boil for 1 hour with 180 parts of trichlorobenzene and 0.5 part of paratoluene sulfonic acid, the liberated water being distilled off. After cooling the reaction mixture, the dyestuff of the formula

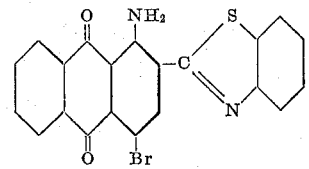

that crystallizes out is washed with trichlorobenzene, benzene and alcohol, and then dried. It dyes polyester fibers stroong bluish red tints possessing an excellent fastness to light and an excellent fastness to sublimation, and its melting point is 258° C. (uncorrected).

Example 4

9.1 parts of 1-amino-4-bromanthraquinone-2-carboxylic acid chloride and 5 parts of 4-chloro-2-aminophenol are suspended in 200 parts of ortho-dichlorobenzene. After the addition of 2 parts of pyridine, the mixture is stirred for 16 hours at 65° C. The product that precipitates is filtered off, washed with ortho-dichlorobenzene, alcohol, dilute hydrochloric acid and water, and is then dried.

10 parts of the product so obtained are heated to the boil, while stirring, along with 180 parts of trichlorobenzene and 0.5 part of para-toluene sulfonic acid hydrate. The mixture is maintained at the boil for 1 hour, during which process the liberated water is distilled off. The dyestuff of the formula

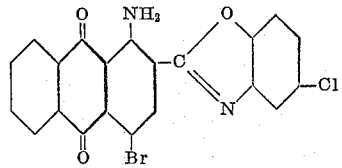

M.P. 325–326° C. (uncorrected)

which precipitates when the reaction mixture has cooled, is filtered off, washed with trichlorobenzene, benzene and alcohol, and then dried. It dyes polyester fibers tints similar to those obtained with the dyestuff described in Example 1; the dyeings obtained are distinguished by an excellent fastness to light and an excellent fastness to sublimation.

When the 4-chloro-2-aminophenol is replaced by an equivalent amount of 4-methyl-2-aminophenol or 4-phenyl sulphonyl-2-aminophenol and the same procedure is adopted as described above, there are obtained the dyestuffs of the formulae

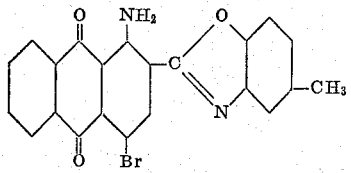

M.P. 292–293° C. (uncorrected)

and

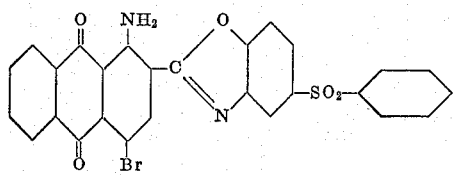

M.P. 349–350° C. (uncorrected)

which likewise dye polyester fibers red tints possessing an excellent fastness to light and an excellent fastness to sublimation.

*Example 5*

14 parts of the dyestuff obtained in the manner described in Example 1 are finely ground in a ball-mill along with 125 parts of a neutral solution of 126 parts of dinaphthylmethane disulfonic acid in 1000 parts of water. A padding liquor of the following composition is prepared:

200 parts of the dyestuff paste described above,
300 parts of sodium alginate,
500 parts of water,
1000 parts.

A polyester fabric is padded (2 runs) with the padding liquor described above in such a manner that its weight is increased by 50 to 60%; it is then dried at 60° C. The fabric is then subjected to a heat treatment for 15 to 120 seconds at a temperature of 200 to 220° C.

It is then soaped at the boil for 30 minutes with a solution of 5 grams of soap in 1 liter of water and is then further treated in the usual manner (rinsing, drying). There is obtained a pure red dyeing possessing an excellent fastness to light and an excellent fastness to sublimation.

What is claimed is:

1. Anthraquinone dyestuffs of the formula

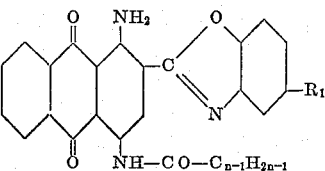

in which $n$ represents an integer of 2 to 4, and $R_1$ represents a member selected from the group consisting of a hydrogen atom, a halogen atom, lower alkyl, amino, phenylsulfonyl and amidosulfonyl.

2. The dyestuff of the formula

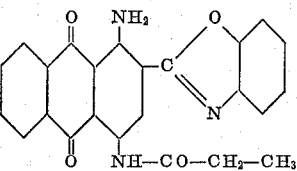

3. The dyestuff of the formula

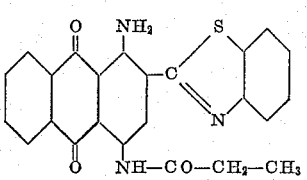

4. The dyestuff of the formula

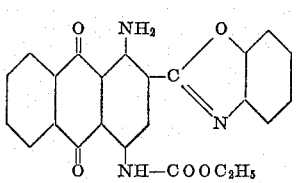

References Cited in the file of this patent
UNITED STATES PATENTS

| | | |
|---|---|---|
| 2,099,673 | Beard | Nov. 23, 1937 |
| 2,792,384 | Holbro et al. | May 14, 1957 |
| 2,868,799 | Neeff | Jan. 13, 1959 |
| 2,982,773 | Grossmann | May 2, 1961 |